UNITED STATES PATENT OFFICE.

FERDINAND PREUSSER, OF COLOGNE-KALK, GERMANY, ASSIGNOR, BY MESNE ASSIGNMENTS, TO THE CHEMICAL FOUNDATION, INC., A CORPORATION OF DELAWARE.

PROCESS OF MAKING OPAQUING AND ENAMELING COMPOUNDS AND PRODUCT.

1,314,831. Specification of Letters Patent. Patented Sept. 2, 1919.

No Drawing. Application filed November 28, 1913. Serial No. 803,437.

*To all whom it may concern:*

Be it known that I, FERDINAND PREUSSER, a subject of the German Emperor, and residing at 31 Wiersbergstrasse, in the city of Cologne-Kalk-on-the-Rhine, Kingdom of Prussia, and German Empire, have invented a certain new and useful Process of Making Opaquing and Enameling Compounds and Product, of which the following is a specification.

This invention has reference to a process of producing compounds for enameling and similar purposes, which compounds may either be used alone and without addition as coating and glazing agents on various articles, or in admixture with fluxes or as an addition to the ordinary molten or fritted glazes or bases ordinarily employed for such purposes or as an outer coating upon a base obtained by these ordinary glazes or the like. The new compounds when added to the solid and ground bases or to such bases in a molten state, act as opacifiers of such enameling bases or the like. The new compounds are not attacked by mineral and organic acids and show the remarkable quality that they are not apt to produce blisters and scaling off and that by their use the various drawbacks hitherto incumbent upon the employment of lime and of phosphates in enamels is overcome.

My new process makes use of the well-known opaquing and turbidity producing properties of some compounds of earth metals and of the oxids of those mostly tetravalent metals exhibiting metallic as well as metalloid properties, such as tin, titanium, zirconium, thorium, antimony, and to some extent bismuth, arsenic and cerium. Various processes have already been suggested to restrict the quantity required of the expensive opaquing compound for producing the desired turbidity, especially of oxid of tin and to improve or increase the covering properties of its various substitutes and to combine economy with satisfactory enameling properties. The addition of opaquing compounds of the alkali earth metals, such as phosphates for instance, to the oxids of tin, of zirconium and of similar metals impart to the mass the objectionable properties of the former, their dulling action and the formation of blisters and the reduction of fluidity of the melt which are peculiar to the compounds mentioned. Nor has the use of silicates of zirconium and of similar elements been satisfactory as these compounds possess only a very weak clouding or opaquing action and the formation of decomposition products of such silicates or of the opaquing compounds of the tetravalent metals which has been proposed in another process presents the serious drawback that the masses thus obtained contain soluble and volatile decomposing agents and decomposition products which are not completely removed in the compounding process and are the causes of blisters, scaling-off and cracking of the enamel with the accompanying inconvenience of having some of the constituents of the enamels attacked by water, acids and the components of the food or other substances contained in vessels to which such enamels have been applied. It has also been suggested to increase the resisting qualities of antimony and tin opacifiers by combining these elements with alumina either by allowing their salts to react upon each other or by heating the oxids in the presence of an acid, but this process does not produce an increase of the opaquing qualities and in the case of tin even the diminishing of the same and the use of an acid is objectionable in view of the liability of blisters being produced by the small quantities of acid, always remaining in the calcined product.

In accordance with my invention a satisfactory enameling compound in which the opaquing properties of the constituents are not only not impaired, but are considerably intensified without the drawbacks of the previous processes is obtained by mutual decomposition and reaction of two groups of enameling substances, one of these being the turbidity producing or opaquing salts and compounds of the alkaline earth metals and some earth metals the oxids of which do not possess this quality, particularly the phosphates, silicates and aluminates, which latter have been known for their quality of producing opaqueness in glazes, glasses and enamels generally, while the other group consists of the opaquing oxids or compounds of what I call border elements, that is to say those mostly tetravalent and partly trivalent comparatively easily fusible metallic elements which partake of the characteristics of metals as well as of metalloids, and the oxids of which have been used heretofore for the purpose of producing different degrees of transparency or translucency or opaqueness in glass and glazes, such as for instance tin, titanium, zirconium, thorium, antimony and to some extent bismuth, arsenic and cerium. The two different groups of substances must be so intimately and chemically combined with each other for producing the new opaquing agent, which is the subject of my invention, that the original constituents cease to exist as such and do not exist as a mere mixture as is the case in some of the previous processes referred to, an entirely new chemical compound of complex nature being formed the opaquing properties of which are highly superior to those of the original constituents combined. The manufacture of this product may be carried out both in the dry as well as in the wet way by the ordinary chemical methods, that is to say by either burning the constituents at a very high temperature sufficient to insure a thorough mutual decomposition and reaction or by causing solutions of substances of the two constituent groups to act upon each other, the resulting precipitate being then collected and thoroughly washed so as to remove all soluble and volatile constituents and decomposition products such as alkali metal salts for instance. In a similar manner when proceeding in the dry way the heat must be high enough and the heating must be continued sufficiently long to burn off or volatilize volatile salts or decomposition products, alkalis and alkali metal salts and the like so as to obtain a product in which none of these agents which might volatilize or impair the fluidity of the enamel coating or which would be soluble in water and acids are contained. Generally the removal of the volatile constituents takes place at a temperature which is lower than that employed for the burning of the enamel. Phosphates, silicates and aluminates of the above mentioned metals which form opaquing oxids and chemical combinations thereof with the alkali earth metals are thus produced in which owing to the mutual decomposition which has taken place the clouding oxids such as silicon dioxid are contained in an exceedingly fine almost colloidal distribution similar to a dyeing agent so that this artificial product and the opaquing and enameling results thereby produced are entirely different from the natural silicates of the rare earth metals and the very weak clouding effects of the same. The thorough chemical decomposition taking place in the manufacture of the new opaquing products also accounts for the absence of the injurious effects of the presence of phosphorus and lime which one has to contend with when using mere mixtures with phosphates and alkaline earths. By employing the process and product according to this invention a considerably smaller amount of the expensive opaquing oxids is necessary in order to produce the same degree of turbidity than by using such oxids merely mechanically mixed with other opaquing bodies or even when used alone. Thus it has been found for instance that by reducing the amount of oxid of tin or of zirconium in the enameling compound to a very low percentage, an effect can be produced which is identical with what could be obtained heretofore only by the use of about three times the amount of these bodies.

As an illustration of carrying my invention into effect I may mention the following examples, it being of course, understood that I may change the proportions of the various constituents and also use other constituents in place thereof within the meaning of the claims hereunto appended and without deviating from the spirit of my invention. Thus for instance, when proceeding by the wet way I may employ 55 parts of zirconium-oxychlorid in mixture with 2.5 parts of magnesium sulfate and 5 parts potash alum. This is dissolved in water and is then treated with a solution of 20 parts of sodium phosphate, 5 parts sodium silicate and 10 parts of sodium hydrate. By this means a complex body containing silicates and phosphates of zirconium and of aluminum with some phosphate and silicate of magnesium is formed. The soluble and volatile decomposition products are washed out. In order to proceed in the dry way I may for instance, use a mixture of zirconium hydroxid with aluminum oxid or hydroxid and calcium phosphate and melt the same together, and if necessary a small amount of magnesium carbonate or of borax may be added with a view of assisting in the decomposition of the calcium phosphate, as well as for the purpose of regulating the melting of the mass and the adhering qualities of the enamel produced therewith. In another instance I may use a mixture of calcium phosphate and of calcium silicate, feldspar or the like as a reacting agent in the dry way, the feldspar furnishing by decomposition the aluminium silicate, calcium aluminate, and free silicon dioxid. Another instance of carrying my invention into effect in the wet way is by dissolving for instance chlorid of tin, calcium chlorid and aluminium chlorid together and treating the solution with a mixture of about 25 parts of sodium phosphate and 6 parts of sodium silicate so as to form opaqueness producing calcium phosphate and calcium silicate which in their turn react with the other constituents. Another instance of proceeding in the dry way consists in treating chlorids of tin, calcium and aluminum with calcium phosphate in the presence of feldspar or the like, the feldspar acting as a means of regulating the melting process and as a source of aluminium silicate and of free silicon dioxid. The production of the opaquing compounds may also be effected, for instance, by treating the phosphates, silicates and aluminates directly with the oxids or hydroxids or the colloids of the border elements referred to, such as tin, titanium or the like, in which case the semi-metallic and semi-metalloid nature of the border elements causes the formation of tin- titanium- or the like phosphates, silicates and aluminates and also the combination of some of the border elements with the base with which the phosphoric and silicic acids and the oxid of alumina were originally combined, thus forming in every instance a complex new chemical compound or chemical composition product. In place of salts of magnesium in the examples stated above which will be contained in the final product as magnesium oxid in combination with other ingredients, compounds of other light metals may be used as a means of regulating the fluidity and of assisting in the decomposition.

Some of the opaquing phosphates, silicates and aluminates of the alkaline earths and earth metals, which are used in the reaction process may be obtained especially in the wet way in the course of manufacture of the new opaquing compound by starting with substances from which they will be formed during the reaction process itself as shown in the examples above outlined. A mixture of the various reagents, that is to say of silicates with either phosphates or aluminates or of all three of them has been found useful as a reacting agent and the presence of alumina has also been found of advantage, probably in view of the fact that part of the aluminate formed during reaction is decomposed in its turn, forming most finely subdivided and perhaps colloidal or jelly like aluminium oxid. As appears from the examples cited the phosphates, silicates and aluminates formed by reaction are not the neutral but basic salts whereby a further decomposition of some of the constituents is brought about and a condition obtained which prevails in the phosphates, silicates and aluminates found in nature with the difference however, that in the new chemical composition or reaction product of my invention a much finer subdivision of the various opaquing agents is obtained in view of their being formed in the nascent state and not by a secondary reaction brought about by the action of other reagents during a very long time.

The new chemical compositions or reaction products made in accordance with my invention besides being used for enameling purposes, inasmuch as they constitute homogeneous masses obtained by fusion at a high temperature, may also be used as molding substances for the direct manufacture of various articles, slabs, plates, pieces of chemical apparatus, household articles, articles of ornamentation and decoration. When used as enameling compounds they may either be used alone or as additions to the ordinary molten or fritted glazes or ground enamels or bases used for enameling purposes, the new compounds being either added to the solid and ground bases or glazes or to these substances in a molten state. The appearance of the new products is generally porcelain-like or like milk-glass with conchoidal fracture.

I claim:—

1. The process of producing opaquing compounds suitable for enameling and other purposes which consists in chemically reacting upon compounds of the opaquing elements which exhibit both metallic and metalloid properties with those salts and salt-like compounds of otherwise non-opaquing earths and alkali earth metals, which are insoluble in the cold in fluxes, glazes, enamels and glasses, and eliminating soluble and volatile constituents from the reaction product.

2. The process of producing opaquing compounds suitable for enameling and other purposes, which consists in reacting chemically upon compounds of the opaquing elements which exhibit both metallic and metalloid properties with opaquing phosphates, silicates and aluminates of otherwise non-opaquing earths and alkali earth metals, substantially in the absence of alkali metal salts and at a high temperature.

3. The process of manufacturing opaquing compounds and enameling compounds, which consists in chemically reacting upon compounds of the opaquing elements which exhibit both metallic and metalloid properties with phosphates of the alkali earth metals in the presence of silicates and aluminates and substantially in the absence of soluble alkali metal salts.

4. The process of producing opaquing and enameling compounds, which consists in treating and chemically decomposing and reacting upon compounds of the opaquing elements which exhibit both metallic and metalloid properties with phosphates, silicates and aluminates of otherwise non-opaquing earths and alkali earth metals in the presence of magnesium compounds, and removing the soluble and volatile reaction products and adding the remaining reaction product to a suitable glass-like base.

5. The process of manufacturing opaquing compounds, which consists in reacting upon oxy-compounds of the opaquing elements which exhibit both metallic and metalloid properties with another, substantially salt-like compound of otherwise non-opaquing earths and alkali earth metals, which is insoluble and therefore, turbidity producing in cold fluxes, glazes, enamels and glasses, in the presence of alumina, and removing any soluble and volatile constituents in the course of reaction.

6. The process of manufacturing opaquing and enameling compounds which consists in treating compounds of the opaquing elements which exhibit both metallic and metalloid properties with a solvent, dissolving compounds not belonging to said class of elements and containing earth metals and alkali earth metals, and treating the mixture of both classes of compounds with phosphates, silicates and aluminates, separating the resulting precipitate and subjecting it to the action of heat.

7. The process of manufacturing opaquing and enameling compounds which consists in treating compounds of the opaquing elements which exhibit both metallic and metalloid properties with a solvent, treating the solution with opaquing phosphates, silicates and aluminates of other elements, separating the resulting precipitate from the liquid, washing said precipitate, and subjecting it to the action of heat and calcining and melting the same.

8. An artificial enameling and opaqueness producing compound which consists of the chemical reaction and chemical combination product of compounds of the opaquing elements which exhibit both metallic and metalloid properties with salts and salt-like compounds of otherwise non-opaquing earth metals and alkali earth metals, which are insoluble in cold fluxes, glazes, enamels, and glasses, said products being free from soluble and volatile constituents.

9. An enameling and opaquing composition, consisting of an artificial chemical reaction product of chemical compounds of the opaquing elements which exhibit both metallic and metalloid properties, with phosphates of earth metals and of alkali earth metals, said products being free from soluble and volatile constituents.

10. A composition of matter consisting of an opaquing, generally opaque compound, suitable for enameling, molding and other purposes, and being an artificial chemical reaction product of chemical compounds of the opaquing elements which exhibit both metallic and metalloid properties with phosphates of the alkaline earths, said products being free from soluble and volatile constituents and reaction products and containing silicon dioxid and alumina.

11. An opaquing compound of generally opaque and porcelain-like appearance and suitable for enameling and other purposes, and consisting of an artificial calcined and fused chemical combination and reaction product of oxy-compounds of the opaquing elements which exhibit both metallic and metalloid properties with phosphates and silicates of other elements and alumina, all of which possess opaquing properties, said product being free from soluble and volatile constituents and from soluble and volatile reaction products.

12. An artificial calcination and fusion product, suitable for opaquing, enameling and other purposes, and consisting of the chemical reaction, combination and decomposition product of compounds of the opaquing elements which exhibit both metallic and metalloid properties with opaquing compounds of earth metals and of alkali earth metals, these said compounds being insoluble in the cold in fluxes, glazes, and enamels, and containing magnesia and alumina and free from soluble and volatile constituents and reaction products.

In testimony whereof I hereby affix my signature, in presence of two witnesses.

Dr. FERDINAND PREUSSER.

Witnesses:
 Amis Vandory,
 Andreas Schmitz.